United States Patent [19]
Horwitt et al.

[11] 4,207,455
[45] Jun. 10, 1980

[54] AUTOMATIC ELECTRIC CIGAR LIGHTER WITH BASE SWITCH

[75] Inventors: Laurence G. Horwitt, New Haven; Donald J. Mattis, Norwalk, both of Conn.

[73] Assignee: Sun Chemical Corporation, New York, N.Y.

[21] Appl. No.: 949,657

[22] Filed: Oct. 10, 1978

[51] Int. Cl.² .............................................. F23Q 7/02
[52] U.S. Cl. .................................. 219/265; 219/262; 219/267; 337/348
[58] Field of Search ............... 219/260, 263, 264, 265, 219/266, 267, 270, 376, 536, 552; 337/348; 338/263, 265

[56] References Cited

U.S. PATENT DOCUMENTS

| | | | |
|---|---|---|---|
| 2,207,601 | 7/1940 | Shakespeare et al. | 219/265 |
| 2,213,373 | 9/1940 | Bahr | 219/265 |
| 2,220,978 | 11/1940 | Shakespeare et al. | 219/265 |
| 2,248,017 | 7/1941 | Cohen | 219/265 |
| 2,999,142 | 9/1961 | Woodhall et al. | 337/348 |
| 3,288,353 | 3/1966 | Lybrook | 219/265 |
| 3,760,150 | 9/1973 | Fenn et al. | 219/265 |
| 4,130,815 | 12/1978 | Horwitt et al. | 219/267 X |

FOREIGN PATENT DOCUMENTS

1910949  3/1969  Fed. Rep. of Germany ........... 219/265
2755620 12/1977 Fed. Rep. of Germany ........... 219/265

*Primary Examiner*—Volodymyr Y. Mayewsky
*Attorney, Agent, or Firm*—Cynthia Berlow

[57] ABSTRACT

An automatic electric cigar lighter for automobiles and the like having a socket and an ignitor plug receivable in the socket. The plug comprises a manually operable part carrying an electric heating element which can be electrically connected to the socket circuit, the latter having a normally open heat-responsive switch that becomes closed normally-open the manually operable part is first pushed to a deep position in the socket. The socket has a grounding circuit and a "hot" contact that is engageable with a cooperable contact on the plug to effect the electrical circuit through the heating element. The socket also carries a bi-stable bimetallic member which is engageable with one of the parts of the noramlly-open switch to control the latter. The bimetallic member normally occupies an open-circuiting position wherein it abuts the one switch part to maintain the switch open. When the manually operable part of the ignitor plug is first depressed, the cooperable contact of the ignitor plug is brought into engagement with the "hot" contact of the socket while at the same time the bimetallic member is actuated to its close-circuiting position, this effecting energization of the heating element and resulting in rapid heating of the bimetallic member. After several seconds, the member snaps back to its circuit-opening position wherein it causes disengagement of the switch parts, resulting in de-energization of the element. Central portions of the bi-stable bimetallic member are disposed in close proximity to the switch part, such that the member can quickly effect opening of the switch without need for mechanical securement of its central actuation portion.

26 Claims, 13 Drawing Figures

AUTOMATIC ELECTRIC CIGAR LIGHTER WITH BASE SWITCH

CROSS REFERENCE TO RELATED APPLICATIONS

1. Copending application in the names of Laurence G. Horwitt and Donald J. Mattis, U.S. Ser. No. 873,771, filed Jan. 31, 1978, entitled AUTOMATIC ELECTRIC CIGAR LIGHTER, and having common ownership with the present application.

2. Copending application in the names of Laurence G. Horwitt and Donald J. Mattis, U.S. Ser. No. 868,935, filed Jan. 12, 1978, entitled MANUAL ELECTRIC CIGAR LIGHTER, and having common ownership with the present application.

3. Copending application in the names of Laurence G. Horwitt and Donald J. Mattis, U.S. Ser. No. 841,836, filed Oct. 13, 1977, entitled AUTOMATIC ELECTRIC CIGAR LIGHTER, and having common ownership with the present application.

4. Copending application in the names of Laurence G. Horwitt and Donald J. Mattis, U.S. Ser. No. 950,023 filed Oct. 10, 1978, entitled ELECTRIC CIGAR LIGHTER, having common ownership with the present application.

BACKGROUND

This invention relates generally to automatic electric cigar lighter devices intended for use in automobiles and the like, and more particularly to lighters of this type which are especially adapted to heat to useful incandescence in relatively short intervals of time.

In the past, a large volume of automatic electric cigar lighter constructions for automobiles has been proposed and produced. Generally, such lighters employed a set of bimetallic spring fingers disposed in the socket of a holder device, which were engageable with side surfaces of a heating element cup carried at the inner end of the ignitor plug. When the plug was depressed, the fingers latched over the sides of the heating element cup, establishing a circuit through the element. As the element reached useful incandescence, the bimetallic fingers became heated and would then spread and release the cup and the ignitor plug, enabling these to retract and break the circuit through the element.

Numerous refinements of this basic structure were achieved over the years. Even so, problems sometimes arose, as when one of the bimetallic fingers, for reasons often obscure, shifted into the path of the ignitor plug while the latter was being depressed, resulting in breakage and possible short-circuiting of the socket. This would cause either a blown fuse or else a burned-out wiring harness, depending on the type of current overload protection built into the particular electrical system of the automobile. In other cases, the bimetallic fingers underwent an aging deformation after prolonged use. When this occurred, the socket usually had to be removed, in most cases involving work underneath or to the rear of the dashboard. Where the socket was not readily accessible, such repair or replacement became difficult, costly and time consuming.

Typically, in automatic lighters, there is a period of from ten to fifteen seconds following the actuation of the ignitor plug, until the heating element has reached useful incandescence that is sufficient to enable the plug to snap out in readiness for use. In the past, a number of efforts have been made to reduce this waiting time to just a few seconds. Several such innovative units have employed a bimetal disk disposed adjacent to the heating element, the disk itself constituting one contact of the switch which was adapted to open after the element reached incandescence. By positioning the disk right next to the element, response times on the order of only several seconds were achieved, particularly when an applied voltage was used which exceeded the continuous voltage rating of the heating element.

Various prior lighters of the type employing bimetallic disks had distinct disadvantages. Generally where the contact area of the disk was at its center, the socket was arranged to permanently fasten or mount the disk at its periphery. This mounting for the disk had to be such that it would not interfere with the flexing and snap-type movements thereof, thereby imposing stringent requirements on the tolerances of both the disk and the part or parts which carried it. Also, in most cases, the disk constituted part of the current-carrying circuit, and thus had to be insulated from the remaining parts of the socket. Accordingly, such mountings were often awkward and prone to malfunction in use.

In other constructions, as where the contact area of the disk was at its periphery, the disk was mounted by means of a stud passing through a hole in its center, the end of the stud being staked to hold the disk in place. The problem with this arrangement was that the support area was too small, and the disk eventually loosened, causing poor electrical contact with the stud. Or, if the support area was made sufficiently large, then its freedom of movement was impaired, as well as its proper functioning. Since both the stud and the disk were current-carrying members, any loosening caused either an excessive voltage drop, or else an open circuit, resulting in malfunction or failure of the device. Where the bimetallic disk itself was employed as one contact of the circuit-breaking switch, there occurred burning and pitting at the points of contact, this resulting in both a poor electrical connection and in deterioration of the disk itself, after a period of use. Moreover, where the disk was a current carrier, the relatively heavy current flow associated with ignitor devices resulted in resistance-heating of the disk, aside from the heating effect due to its proximity to the coil. The resistance or self-heating effect depended on the resistances of the electrical path through the disk and stud; there were thus introduced other undesirable variables into the design of the ligher, which caused problems during manufacturing runs where large numbers of units were to be mass produced, from components possibly having slightly different physical and/or electrical characteristics. In addition, in constructions where the bimetallic member was arranged to carry the heating element current, the response time of the member was very adversely affected by energy changes which occurred in the vehicle electrical system, such as drops in the supply voltage resulting from the application of momentary loads by other equipment in the vehicle, or surges in the supply voltage resulting from variation in the rate of charging by the vehicle's alternator or generator. Such variations in the applied voltage resulted in significant corresponding changes in the self-heating effect of the current on the bimetallic member, tending to exaggerate existing non-uniformities of response over prolonged periods of operation and under different environmental conditions.

Applicants' copending application, U.S. Ser. No. 868,935 identified above, discloses an arrangement for a fast-acting manual cigar lighter wherein the manually operable part of the ignitor plug is depressed and held for several seconds, to thereby close the heating element circuit and cause the element to reach incandescence, after which the circuit is automatically opened by a disk-like bimetallic member which is carried in the plug itself.

This particular construction has been found to operate quite well from the standpoint of good reliability and long life expectancy. The number of individual parts required in this prior design has led to attempts to simplify the construction somewhat, so as to reduce the overall manufacturing cost and result in easier assembly. Cigar lighters of the above type are typically built in manufacturing runs of thousands of units. Some of the newer luxury automobiles are provided with four or more of such lighter devices; it can be readily appreciated that the annual sales of such units can easily run into the hundreds of thousands. Accordingly any saving which can be realized, as by reducing the number of parts involved, reducing the cost of such parts, and simplifying the assembly, becomes especially important from an economic standpoint. Of course, while it is considered desirable to reduce the costs of such items as much as possible, it should be realized that these devices must perform in a satisfactory manner, with complete freedom from jamming or malfunctioning, over the projected life of the automobile, which can be a number of years. Conceivably such devices can be subjected to thousands of operations over the life of the car, and in fact, production samples are tested for performance in excess of such figures.

In another of applicants' copending applications identified above, a fast-acting manual cigar lighter has a normally-closed electrical switch controlled by a non-current carrying disk, the disk being carried in the holder device instead of by the plug. This resulted in fewer and simpler parts, with resulting economies while still providing for excellent performance and reliability.

SUMMARY

The variously mentioned above drawbacks and disadvantages of prior cigar lighters are obviated by the present invention, which has for its main object the provision of an improved automatic electric cigar lighter of fast-heating characteristics, which has fewer parts that are especially simple in their construction, the lighter being at the same time reliable in operation and capable of easy assembly with a minimum of time and effort.

A related object of the invention is to provide an improved automatic electric cigar lighter as above, wherein the heat-responsive switching occurs in the socket, utilizing a unique arrangement that lends itself to low-cost, high production assembly techniques.

A further object of the invention is to provide an improved automatic electric cigar lighter in accordance with the foregoing, wherein the response time is on the order of only several seconds, thereby making the unit more convenient to operate and use.

Still another object of the invention is to provide an improved, automatically-controlled electric cigar lighter of the type employing a bimetallic member, wherein the latter is mounted in the holder device in a unique manner, with its central switch-actuating portion free and clear of all permanent attachment to any other parts.

Yet another object of the invention is to provide an improved automatic electric cigar lighter as set forth above, wherein the bimetallic member is not connected in the heating element circuit, thereby being not subject to heating due to current flow through it but instead having its response governed entirely by heat transferred due to radiation and conduction from the heating element.

A feature of the invention is the provision of an improved automatic electric cigar lighter as above characterized, wherein the bimetallic member is not greatly affected by variations in the applied voltage due to changes in charging rate, load changes on the vehicle electrical system, etc. Since the bimetallic member is not a part of the current-carrying circuit, improved operating consistency is obtainable between different units of the same manufacturing run.

The above objects and advantages are accomplished by an automatic electric lighter comprising a unique holder device presenting a socket with two contacts forming part of the energizing circuit, and an ignitor plug comprising a manually operable part, which is removably carried in the socket and has a usual type of heating element at its inner end. Disposed in the holder device is a novel, automatically-controlled electrical switch which is adaped to be connected in circuit with the heating element, and is normally open. A bimetallic disk-like switch-actuator member is provided, also carried by the holder device and having its center portions free and clear of permanent attachment to any other parts. The bimetallic member is disposed so that it can be closely adjacent to the heating element when the ignitor plug is in the deep, energizing position so as to receive radiant heat therefrom, and has its actuator portion adapted for engagement with one part of the circuit-controlling switch. The arrangement is such that upon actuation of the manually operable part, the bimetallic member is set to an energizing position and the switch closed whereby the heating element is then energized through the switch. After the element reaches useful incandescence, the bimetallic member snaps to a circuit-opening position wherein it opens the switch and de-energizes the heating element.

The bimetallic member, not being a part of the current-carrying circuit, undergoes no heating due to current flowing through it. Nor is it riveted, welded, staked, or similarly secured in place. Therefore its movement is not unduly restricted, being governed only by the radiant heat received from the heating element. The response time is thus not affected by the electrical resistance of the member, or by contact resistances associated with mounting and surface areas of the member itself. The large voltage variations encountered in the automobile supply, likewise, will not have any direct effect on the bimetallic member. Because the member remains substantially unmodified when placed in the environment of the lighter, it enjoys the inherent reliability of a simple bimetal part, since there exists no possibility of the member suffering damaging stresses resulting from welding, machining, staking, etc. In addition, the member is not employed as a contact, and accordingly there is no deterioration of the same, which might otherwise result from arcing or pitting. Moreover, since there is no part anywhere in the cigar lighter that is permanently attached to the center of the bimetallic member, there exists nothing to interfere with its normal snap or flexing movements under the influence of heat received from the heating element. Greatly improved reliability and long life expectancy are thus realized.

The manufacturing economies that are realizable with the present construction enable the device to be produced inexpensively in large runs involving thousands of units. This is particularly important in the automobile industry where great emphasis is placed on reducing the overall cost of the product as much as possible, without sacrificing overall reliability or safety.

Other features and advantages will hereinafter appear.

In the accompanying drawings, illustrating a preferred embodiment of the invention.

Figure 1:
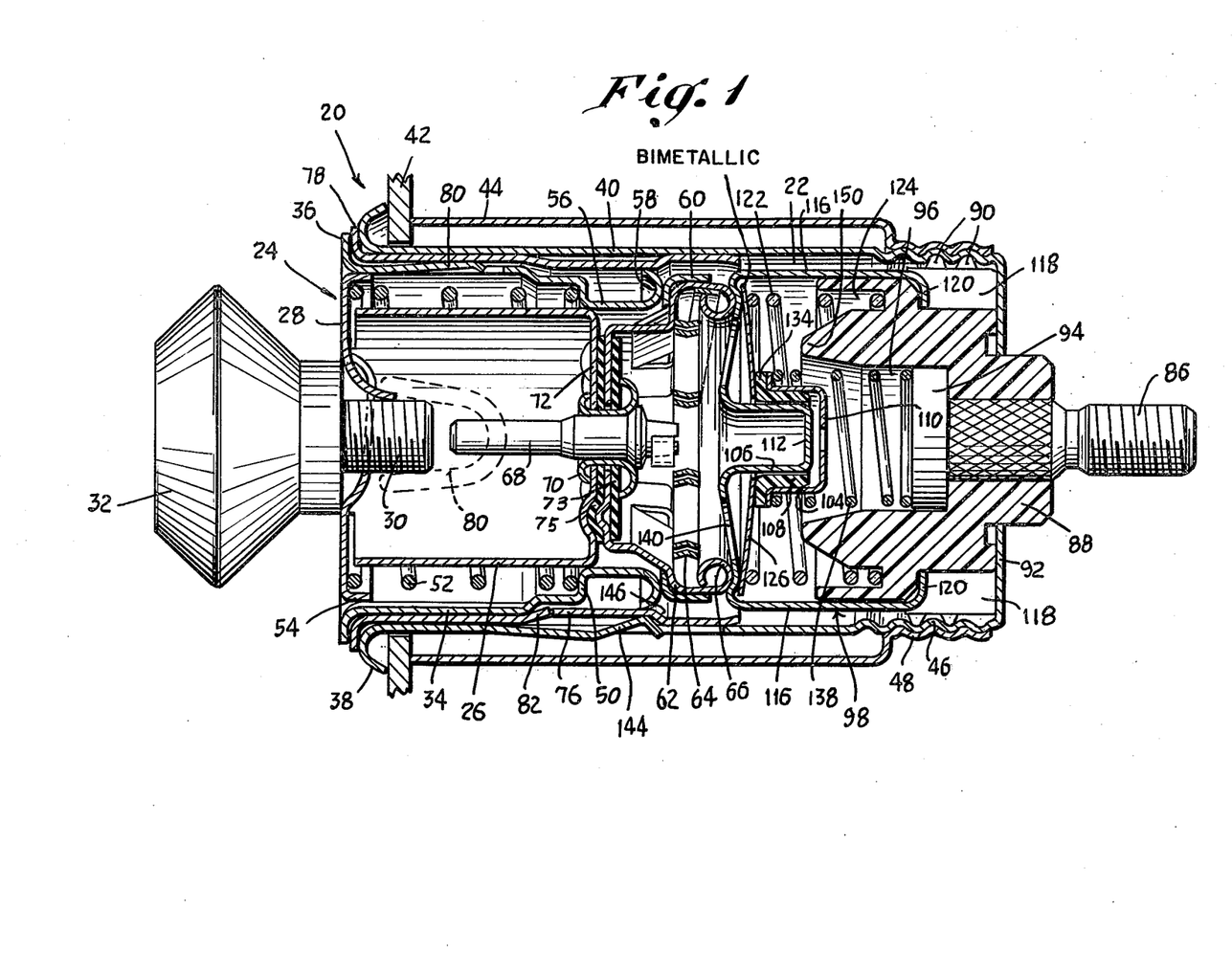
FIG. 1 is an axial sectional view of the improved automatic electric cigar lighter of the present invention, showing the ignitor plug disposed in the holder device or receptacle, in its unenergized or storage position and wherein an automatically-controlled switch carried by the holder device is open. The bimetallic switch actuator disk or member is in its open-circuit position.
Figure 2:
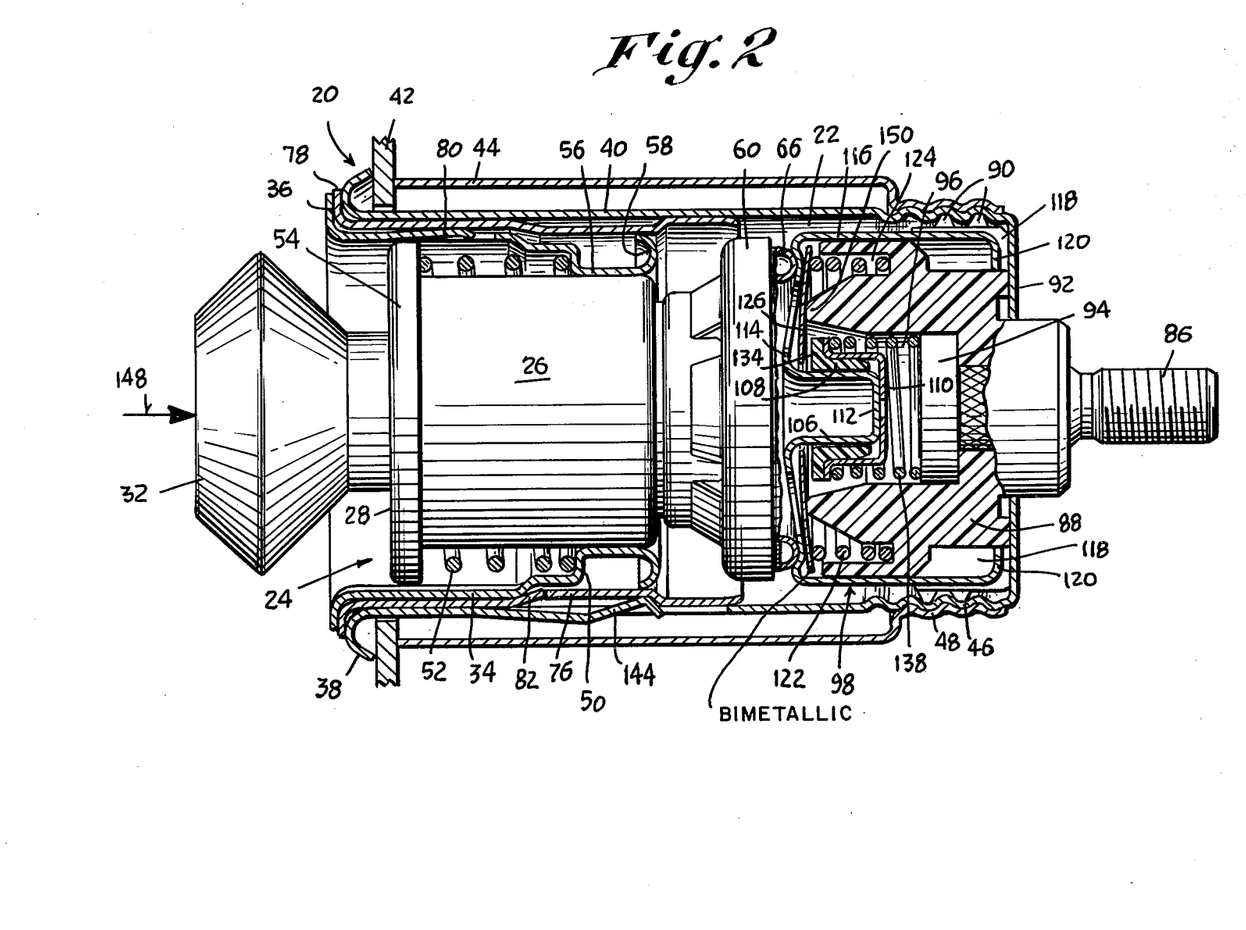
FIG. 2 is a view like that of FIG. 1 but partly in elevation, showing the manually operable part of the ignitor plug as having been shifted to a deep position in the socket of the holder device. The bimetallic operator has been shifted to its closed-circuit position, and the switch has been closed whereby there is effected the energization of the heating element.
Figure 3:
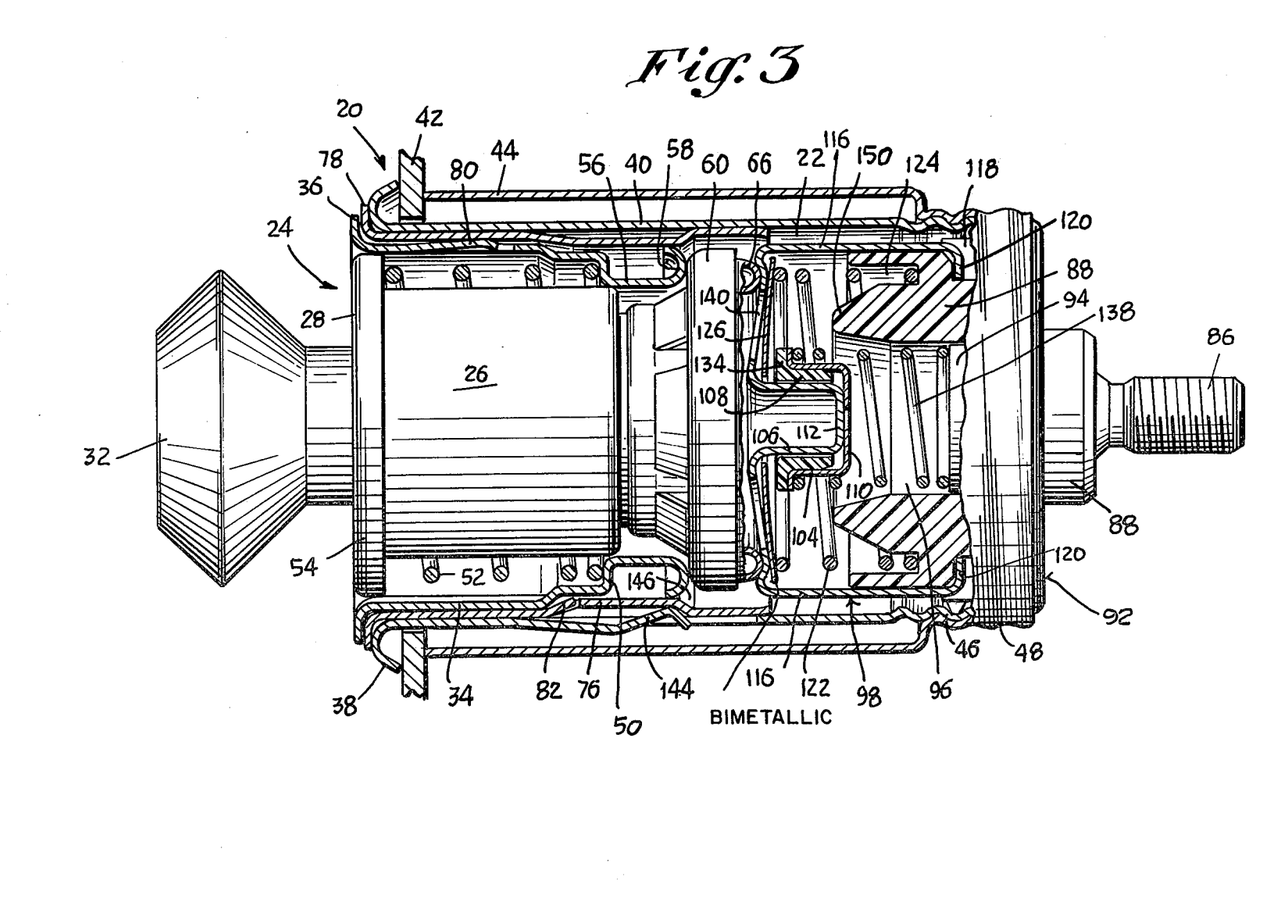
FIG. 3 is a view like that of FIGS. 1 and 2, except that the manually-operable part of the ignitor plug has been released, and has returned to its forward position in the holder device socket. The bimetallic member or disk associated with the switch is being rapidly heated due to its close proximity to the energized heating element, and will shortly shift from its closed-circuit position to its circuit-opening position of FIG. 1, thereby separating again the switch contact parts and opening the circuit through the heating element.
Figures 4, 5:
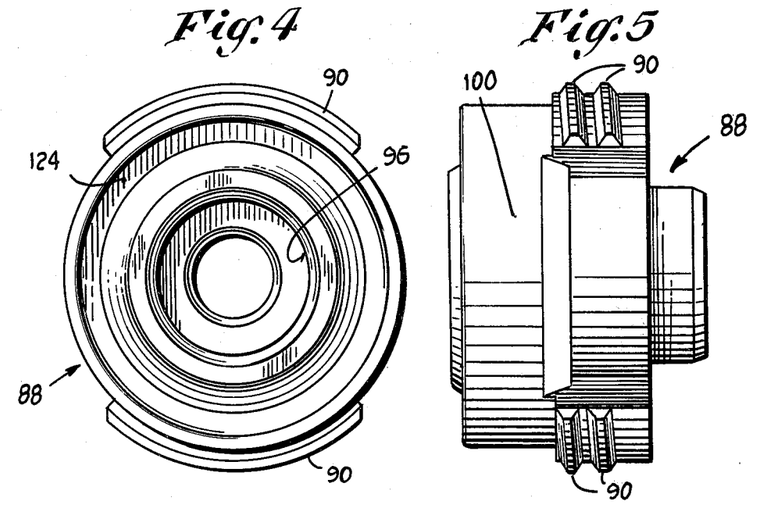
FIG. 4 is a right end elevation of an insulating slide and terminal block carried by the holder device of the lighter of FIGS. 1–3, on which one of the socket contacts is mounted.
FIG. 5 is a side elevational view of the block of FIG. 4.

Referring first to FIGS. 1–3, the improved automatic electric cigar lighter of the present invention comprises in its basic make-up essentially a holder device 20 which presents an outwardly-facing socket 22, and an ignitor plug 24 which is removably carried by the holder device.

The ignitor plug 24 has a manually operable part in the form of a cylindrical body 26 which carries at its front a cap 28 provided with a threaded aperture to receive the screw 30 of a manually engagable knob 32.

Slidably carried by the plug body 26 is a cylindrical friction sleeve 34 having an out-turned front flange 36 which is located forwardly of a bezel 38 on a cylindrical holder device body 40 that is attached to a supporting panel 42 by means of a clamping sleeve 44. The rear or inner end of the body has screw threads 46 engaged by cooperable threads 48 of the clamping sleeve 44, as shown.

The friction sleeve 34 adjacent its inner end has an annular shoulder 50 which is engaged by a helical coil spring 52 that also engages the front cap 28 of the ignitor plug. The cap 28 has a back-turned annular flange 54 which is slidable in the friction sleeve 34 and constitutes a bearing therefor.

Disposed rearwardly past the shoulder 50 of the friction sleeve is a cylindrical portion 56 of reduced diameter, terminating in an out-turned annular flange 58 that is engageable with a ring-shaped anodized-aluminum insulating member 60 carried by a heating element cup 62 which is of known construction. The cup 62 contains a heating element 64 of spiral configuration, having its outer convolution or end crimped under an inward curl 66 of the cup and having its innermost end secured to a stud 68 which is carried in an eyelet 70 that is secured to the inner transverse wall 72 of the plug body 26.

The heating element cup 62 is insulated from the eyelet 70 and from the wall 72 by insulating and centralizing washers 73, 75 as shown.

Movement of the friction sleeve 34 on the body 26, as occasioned by expansion of the spring 52, is restricted in one direction, by engagement between the flange 58 of the sleeve and the insulating ring 60 on the cup 62. In the opposite direction, the relative movement is restricted by the tightening and bunching of the coil spring 52, which is seen to occupy the space between the shoulder 50 of the friction sleeve and the cap 28 which carries the knob 32.

The ignitor plug 24 also includes a cylindrical ashguard member 76 having at its front end a flange 78 which is interposed between the flange 36 of the friction sleeve 34 and the bezel 38 of the holder device 20. The reduced portion 56 of the friction sleeve 34 slides on the exterior of the plug body 26, having a bearing thereon.

The friction sleeve 34 has spring fingers 80 which bear against the inside of the ashguard 76 to provide a sliding engagement therewith. The ashguard 76 has lanced fingers 82 which are engageable with the annular flange 58 of the friction sleeve to limit the projecting (rearward) movement of the ashguard on the ignitor plug 24, and the opposite movement of the ashguard is limited by engagement between the flange 78 thereof and the flange 36 of the friction sleeve.

Further details relating to the above-described portions of the holder device 20 and the ignitor plug 24 are not treated here in detail, being described in the copending applications and pertinent prior art patents identified above which have the same ownership as the present application.

The holder device 20 has a connector terminal 86 which is carried in an insulating block 88 having exterior threads 90 by which it is screwed into the threaded rear part of the body 40, against a rear transverse wall 92 thereof. The insulating block 88 can be molded or otherwise formed so that the terminal 86 forms an insert, such terminal having an inner head portion 94 in a bore 96 of the block.

Figure 6:
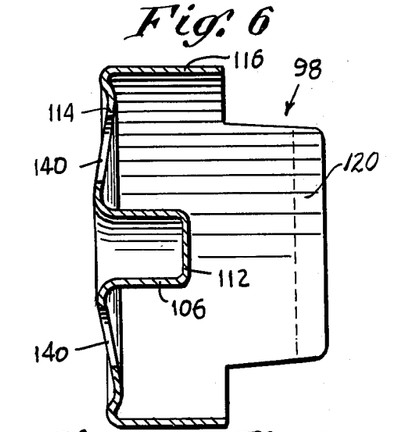
FIG. 6 is an axial sectional view of one of the switch parts of the automatically-operated switch.
Figure 7:
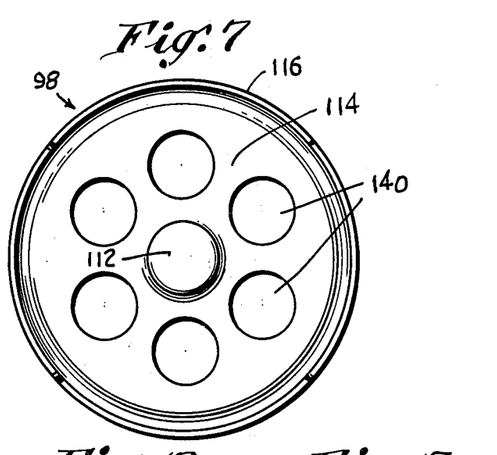
FIG. 7 is an end elevational view of the switch part of FIG. 6.
Figures 8, 9, 10, 11, 12, 13:
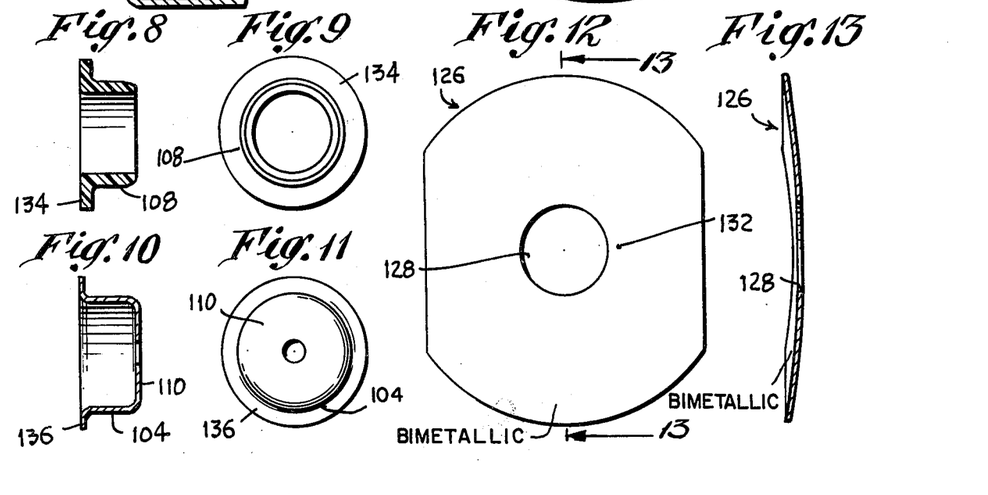
FIG. 8 is an axial sectional view of an insulating bushing of the electrical switch.
FIG. 9 is an end elevational view of the bushing of FIG. 8.
FIG. 10 is an axial sectional view of the other part of the electrical switch.
FIG. 11 is an end elevational view of the switch part of FIG. 10.
FIG. 12 is a plan view of the bimetallic member or actuator for the electric switch.
FIG. 13 is a section taken on the line 13—13 of FIG. 12.

In accordance with the present invention, the holder device 20 is provided with a unique, thermally controlled electric switching and contact means by which energization of the heating element 64 can be automatically controlled and safely effected during a relatively short time interval of several seconds duration. The electric switching, contact, and thermal timing devices are carried by the insulating block 88, and the assemblage includes a formed metal slider member or follower contact 98 (see FIGS. 6 and 7) that is slidably carried on the block 88, on a slide portion 100 thereof. The member 98 has a number of functions. It constitutes an active contact of the thermally controlled electric switch, and also constitutes one of a pair of socket contacts, said one being engageable with the heating element cup 62 of the ignitor plug 24. Additionally, it constitutes a slider which is movable axially on the insulating block 88 against the biasing action of coil springs. The other socket contact comprises the holder device body 40.

As shown, the improved electric switching device comprises outer and inner, telescoping cylindrical metal members 104 and 106, the latter being an integral part of the member 98. An insulating sleeve 108 is interposed between the switch members, 104, 106 to provide insulation while at the same time permitting relative sliding movement therebetween. The switch member 104 has a transverse end wall 110 which is engageable with the end wall 112 of the member 106 to effect electric contact thereto, so as to conduct current between these members.

The slider member 98 has a circular or annular wall 114 which joins the contact portion 106 to the outer, slider portion 116 of the member. The insulating block 88 has a plurality of clearance slots 118 adapted to accommodate inturned flange portions 120 of the slider portion 116 so as to retain the member 98 in a given, forwardly-projected position as effected by a helical coil spring 122 which has an end disposed in an annular groove 124 of the insulating block 88. The other end of the spring 122 bears against a bimetallic, switch-actuator disk 126 having a central aperture 128 by which it is enabled to be carried on the switching member 106. The outer periphery of the disk 126 is interposed between the spring 122 and the annular wall 114 of the member 98.

The disk 126 is of the bi-stable variety, by which it can occupy either of two bowed positions when it is in the cold state. These two cold positions are illustrated in FIGS. 1 and 3, and the position of FIG. 1 is also illustrative of the heated position which the disk can occupy.

The inner peripheral portions 132 of the disk are adapted for abutting engagement with a flange 134 of the insulating sleeve 108 of the switch, and the switch member 104 has a flange 136 which is engageable with the insulating flange 134 and is held thereagainst by a helical coil spring 138 that also engages the head portion 94 of the connector terminal 86.

It will be seen that the annular wall 114 of the member 98 is interposed between the disk 126 and the heating element 64, and such wall is provided with a plurality of apertures 140 to enable an effective heat transfer to occur from the heating element to the disk.

The helical coil spring 138 is especially adapted to carry the heavy current for the heating element 64, and for this purpose it can be constituted of spring steel wire which is clad with copper, preferably by a process that results in a relatively thick copper overlay on the steel. The result is improved electrical conductivity by virtue of the copper component, and reliable spring action due to the steel core.

The operation of the improved automatic electric cigar lighter can now be readily understood from an inspection of FIGS. 1-3. In FIG. 1 the cold or storage position of the lighter is shown. The bimetallic disk 126 is bowed in such a manner that it maintains the contact wall 110 of the contact member 104 out of engagement with the contact wall 112 of the slider member 98. The coil springs 122 and 138, in conjunction with the bowed bimetallic disk 126, maintain the annular contact wall 114 of the slider member (which constitutes the "hot" contact of the holder device 20) in engagement with the curled rim 66 of the heating element cup 62. Such engagement is also maintained by the friction fingers 80 of the friction sleeve 34 and detent fingers 144 which are lanced from the tubular body 40 and engage an annular shoulder 146 of the ashguard 76. The coil spring 52 improves the electrical conductivity, but can be omitted if desired.

The circuit from the multi-purpose slider-contact member 98 to the ground return of the holder device 20 can be readily traced from the engagement between the slider member and the heating element cup 62, from whence current goes to the outer convolutions of the heating element 64, then to the central convolution and rivet 68, then through the eyelet 70 an plug body 26, through the spring means 52 and friction sleeve 34, and lastly from the ashguard 76 to the holder device body 40 which latter is grounded at the panel 42. The holder device body 40 constitutes the "cold" contact of the socket 22, whereas the slider member 98 constitutes the "hot" contact of the socket member, being energized from the "hot" connector terminal 86.

To energize the lighter, the knob 32 is depressed as indicated by the arrow 148 in FIG. 2, and then let go. This action first flexes and bows the bimetallic disk 126 to an opposite curvature as indicated in FIGS. 2 and 3, by virtue of the peripheral portions of the disk being laterally displaced by the rearward movement of the slider member 98 and the fulcrumming action of an annular fulcrum portion 150 of the insulator block 88. The disk 126 snaps quickly to this opposite curvature, permitting the switch contact wall 110 to engage the switch contact wall 112 as shown in FIG. 2. Removal of the actuating force from the knob 32 will permit the ignitor unit 24 to return to its FIG. 1 position, as now seen in FIG. 3. However, contact remains established between the slider member 98 and the heating element cup 62, by virtue of the cooperation between the various components already explained above. Current will now flow through the switch 110, 112 and through the heating element 64, causing incandescence of the latter. The radiant heat will pass through the apertures 140 of the slider member and quickly heat the disk 126, causing it to reversibly flex back to the FIG. 1 position, thereby opening the energizing circuit at the contact walls 110, 112. An audible click is heard upon such reverse snapping movement of the disk, thereby signalling the operator that the lighter is in readiness for use with the heating element 64 in an incandescent state.

After removal and use of the ignitor plug 24 it is reinstalled to the position of FIG. 1; the thermally controlled switch being now open, is in readiness for the next use.

We have found that an automatic lighter constructed in accordance with the present invention is especially effectively and reliable in use. It provides a shortened period of time to effect the required incandescence, and safely opens the circuit through the heating element before excessive heating of the latter occurs even though the applied voltage to the lighter is greater than the continuous duty rating of the coil.

It will be seen that the construction of the lighter is characterized by a desirable symmetry and simplicity of the parts, there being concentricity about the axis of the ignitor plug and holder device. The operation of the parts is simple and straight-forward, and no permanent fastenings are used to retain the bimetallic disk, whereby the latter has full freedom to carry out its snapping movement as above explained.

In consequence, there is had an important economy in the manufacture of the lighter, while at the same time high reliability and precision of operation are achieved.

Variations and modifications are possible without departing from the spirit of the invention.

What is claimed is:

1. An automatic electric cigar lighter, comprising in combination:
   (a) a holder device including a socket having two electrical contacts forming part of the cigar-lighter electrical circuit,
   (b) an ignitor plug receivable in the socket, comprising a manually-operable part movable in the socket between energizing and de-energizing positions,
   (c) said plug having an electrical-resistance heating coil carried at its inner end,
   (d) means for establishing an electrical circuit from the holder device electrical contacts through the heating coil when the said manually-operable part is shifted to its energizing position, the said means including an electrical switch having normally open relatively-movable cooperable electrical contact parts all of which are carried by the holder device, and
   (e) means becoming operative in response to heating of said heating coil, for opening said electrical switch to break said electrical circuit and de-energize the coil, said means including a bimetallic member carried by said holder device and having a circuit-opening position and a closed-circuit position, said bimetallic member carrying no electrical current and having an actuator portion which is free and clear of permanent attachment to any other parts of the holder device, said actuator portion being adapted to shift one of the cooperable electrical contact parts of said electrical switch to effect the opening thereof,
   (f) one of said socket contacts comprising a follower contact which is movable axially with respect to other parts of the holder device, and which moves axially inward with the manually-operable part when the latter is actuated, and which follows the manually-operable part in an axially outward direction when the manually-operable part is released, 2. The invention as defined in claim 1, and further including:
   (a) spring means biasing said manually operable plug part to its de-energizing position in the socket.

3. The invention as defined in claim 1, and further including:
   (a) means insulating said actuator portion of the bimetallic member from said one cooperable electrical contact part of the switch when the bimetallic member is in its closed-circuit position.

4. The invention as defined in claim 1, wherein:
   (a) the bimetallic member comprises a disk mounted within the rear portion of the holder device.

5. The invention as defined in claim 4, wherein:
   (a) said disk has two regions of large movement relative to each other,
   (b) one of said regions constituting the actuator portion of the disk.

6. The invention as defined in claim 5, wherein:
   (a) the actuator portion of the disk comprises the central region thereof.

7. The invention as defined in claim 5, wherein:
   (a) the central region of the disk has an aperture forming an inner pheriphery thereof,
   (b) said electrical switch having a guide portion extending through the aperture of the disk.

8. The invention as defined in claim 7, wherein:
   (a) a peripheral part of the disk constitutes the actuator portion thereof.

9. The invention as defined in claim 7, wherein:
   (a) the guide portion of the electrical switch constitutes one electrical contact part thereof.

10. The invention as defined in claim 9, wherein:
    (a) the guide portion of the electrical switch has means constituting one of the socket electrical contacts.

11. The invention as defined in claim 10, wherein:
    (a) the holder device has a slide,
    (b) said follower contact comprising a slider engageable with and movable on said slide to such that it can occupy either an advanced or else a retracted position in the socket.

12. The invention as defined in claim 11, wherein:
    (a) the holder device has an electrical connector terminal and an electrically insulating block mounting the electrical connector terminal,
    (b) said electrically insulating block having the said slide.

13. The invention as defined in claim 10, wherein:
    (a) the means constituting one socket electrical contact provides a shoulder against which the disk abuts, and
    (b) spring means maintaining said disk in abutting engagement with said shoulder.

14. The invention as defined in claim 1, wherein:
    (a) said electrical switch comprises a pair of telescoping metal cylinders and cooperable electrical contacts carried respectively by corresponding ends of the cylinders.

15. The invention as defined in claim 14, and further including:
    (a) an electrically insulating sleeve disposed between the telescoping cylinders, providing a sliding guide between the same.

16. The invention as defined in claim 14, and further including:
    (a) a pair of concentrically disposed coil springs surrounding the outer of said cylinders, and
    (b) means for transmitting force from said coil springs to said cylinders.

17. The invention as defined in claim 16, and further including:
    (a) an electrical connector terminal on the holder device, (b) one of said coil springs being adapted to conduct electrical current from the electrical terminal to one of said cylinders.

18. The invention as defined in claim 14, wherein:
(a) the electrical contacts of the telescoping cylinders comprise end walls thereof.

19. The invention as defined in claim 18, wherein:
(a) one of said end walls is apertured to improve the contact capability thereof.

20. The invention as defined in claim 15, wherein:
(a) the bimetallic member comprises an apertured disk encircling one of said cylinders, and
(b) electrical insulation between said disk and the other of said cylinders.

21. The invention as defined in claim 4, and further including:
(a) means enabling the ignitor plug, when the movable, manually-operable part thereof is in its energizing position, to exert a flexing force on the disk, and
(b) fulcrum means carried in the holder device, engageable with said disk to apply a force thereto which counters the said flexing force.

22. The invention as defined in claim 21, and further including:
(a) an electrical connector terminal on the holder device, and
(b) an electrically insulating block mounting said electrical connector terminal,
(c) said electrically insulating block constituting said fulcrum means.

23. The invention as defined in claim 22, wherein:
(a) central parts of the disk constitute the actuator portion thereof,
(b) said fulcrum means being circularly disposed and located radially outward of the central parts of the disk.

24. The invention as defined in claim 23, wherein:
(a) the fulcrum means is circular.

25. The invention as defined in claim 4, wherein:
(a) said electrical switch comprises an annular wall disposed transversely in the socket and carrying an electrical contact at its center,
(b) said annular wall being disposed broadside to said disk and arranged to be interposed between the disk and said heating coil when the manually operable part of the ignitor plug is in its energizing position,
(c) said annular wall having apertures to enable radiant heat to pass to the disk from said heating coil.

26. The invention as defined in claim 25, and further including:
(a) fulcrum means carried in the holder device, for engagement with said disk at locations opposite to said apertures.

* * * * *